United States Patent
Canada

(10) Patent No.: US 7,869,570 B2
(45) Date of Patent: Jan. 11, 2011

(54) ELECTROMAGNETIC APPARATUS AND METHODS EMPLOYING COULOMB FORCE OSCILLATORS

(76) Inventor: Larry Canada, 2117 Amherst Trail, Conyers, GA (US) 30094

( * ) Notice: Subject to any disclaimer, the term of this patent is extended or adjusted under 35 U.S.C. 154(b) by 1461 days.

(21) Appl. No.: 11/271,246

(22) Filed: Nov. 11, 2005

(65) Prior Publication Data
US 2006/0126790 A1   Jun. 15, 2006

(51) Int. Cl.
 *G21G 4/00* (2006.01)
 *H05G 1/10* (2006.01)
 *H05G 1/12* (2006.01)
(52) U.S. Cl. .................. 378/119; 378/101; 378/104
(58) Field of Classification Search ......... 378/119–123, 378/101–104
See application file for complete search history.

(56) References Cited

U.S. PATENT DOCUMENTS

| | | | |
|---|---|---|---|
| 4,210,949 A | 7/1980 | Masuda | |
| 4,649,405 A * | 3/1987 | Eastman | ........................ 257/6 |
| 4,663,559 A | 5/1987 | Christensen | |
| 5,210,430 A | 5/1993 | Taniguchi | |
| 5,552,678 A | 9/1996 | Tang et al. | |
| 5,679,043 A | 10/1997 | Kumar | |
| 5,726,524 A | 3/1998 | Debe | |
| 5,901,031 A | 5/1999 | Ishige et al. | |
| 6,195,196 B1 | 2/2001 | Kimura et al. | |
| 6,440,761 B1 | 8/2002 | Choi | |
| 6,445,122 B1 | 9/2002 | Chuang et al. | |
| 6,445,124 B1 | 9/2002 | Asai et al. | |
| 6,553,096 B1 | 4/2003 | Zhou et al. | |
| 6,573,643 B1 | 6/2003 | Kumar et al. | |
| 6,580,225 B2 | 6/2003 | Yaniv et al. | |
| 6,707,244 B2 | 3/2004 | Kimiya et al. | |
| 6,822,783 B2 | 11/2004 | Matsuda et al. | |
| 2002/0089295 A1 | 7/2002 | Kimiya et al. | |
| 2002/0158829 A1 | 10/2002 | Yamazaki et al. | |
| 2004/0066677 A1 | 4/2004 | Zhang et al. | |
| 2004/0212870 A1 | 10/2004 | Katase | |
| 2005/0117705 A1* | 6/2005 | Morrison et al. | ............ 378/136 |

FOREIGN PATENT DOCUMENTS

JP    410079324    3/1998

OTHER PUBLICATIONS

"A Simple X-Ray Emitter," H. Murakami, R. Ono, A. Hirai, Y. Hosokawa, Anal. Sci. 2005, vol. 21.
"Phosphor Challenge for Field-Emission Flat-Panel Dsplays," C. Hunt, A. Chakhovskoi, J. Vac. Sci. Technol. B 15(2) Mar./Apr. 1997.
"New Insights in High-Energy Electron Emission and Underlying Transport Physics of Nanocrystalline Si," S. Uno, K. Nakazato, S. Yamaguchi, Dec. 2003.
A. Kojima, N. Kosida, H. Mizuta, IEEE Transactions on Nanotech., 2, 4, 2003.

* cited by examiner

*Primary Examiner*—Irakli Kiknadze
(74) *Attorney, Agent, or Firm*—Kenneth W. Float

(57) ABSTRACT

A Coulomb force oscillator comprising a power supply having a closed primary winding circuit and an open secondary winding that produces charge differential within the secondary winding to separate positive charges and negative charges therein, and which effects charge separation in an external body coupled to the secondary winding. Switching the power source off causes a collapse of the magnetic field in the primary winding which causes the secondary winding to return to a steady state condition, which causes charge recombination in the external body effecting release of energy. Methods of generating electromagnetic energy are also disclosed.

24 Claims, 4 Drawing Sheets

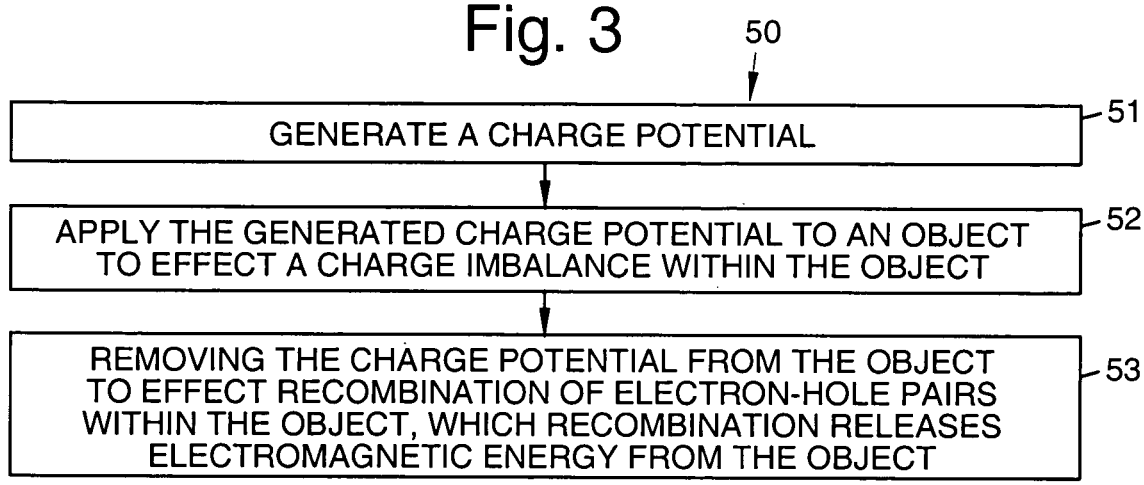
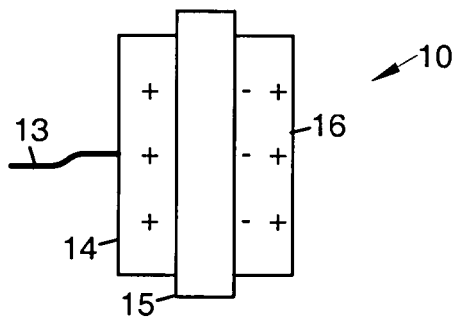
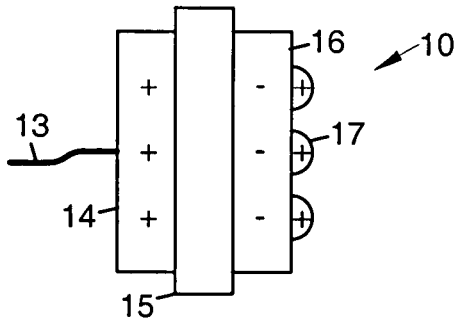
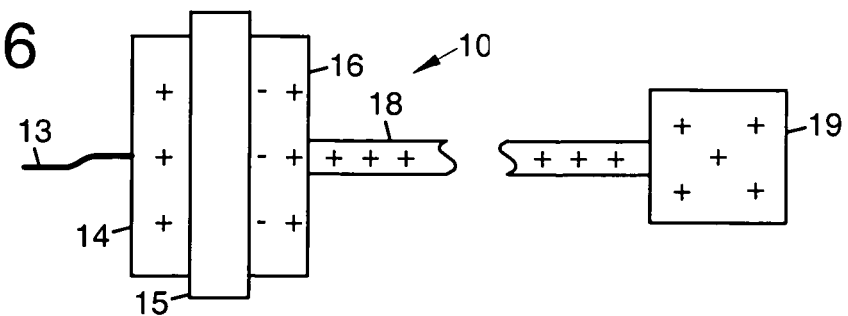

ELECTROMAGNETIC APPARATUS AND METHODS EMPLOYING COULOMB FORCE OSCILLATORS

BACKGROUND

The present invention relates to electromagnetic apparatus and methods and Coulomb force oscillators (CFO) that generate high-density electron emission and separate and recombine electrical charge to generate electromagnetic energy such as photons and x-rays.

Recombination emission occurs when free electrons recombine with holes created by the removal of electrons resulting in the conversion of electric charge potential into electromagnetic energy. The movement, collection, and acceleration of electrons is controlled by Coulomb forces. The electric force acting on a point charge $q_1$ as a result of the presence of a second point charge $q_2$ is given by Coulomb's Law:

$$F = \frac{kq_1 q_2}{r^2} = \frac{q_1 q_2}{4\pi\varepsilon_0 r^2}$$

where $\varepsilon_0$=permittivity of space.

This equation satisfies Newton's third law because it implies that exactly the same magnitude of acts on $q_2$. Coulomb's law is a vector equation and includes the fact that the force acts along the line joining the charges. Like charges repel and unlike charges attract. Coulomb's law describes a force of infinite range which obeys the inverse square law, and is of the same form as the gravity force.

$$k = \frac{1}{4\pi\varepsilon_0} \approx 9 \times 10^9 N \cdot m^2/C^2 = \text{Coulomb's constant.}$$

Like charges repel and unlike charges attract. Negative electrons will move toward a positive charge potential. A Van de Graff generator is a well known example of a device that can separate and store high-voltage electrical charge.

A light emitting diode (LED) exemplifies the recombination emission process. It has two sides of dissimilar material and charge separated by a junction. One side is dominated by positive electric charges and the other side is dominated by negative electric charges. The junction acts as a barrier between the p side and the n side. A few volts applied to the LED terminals will cause electrons to flow from the n side to the p side. Once on the p side the electrons are immediately attracted to the positive charges due to the mutual Coulomb forces of attraction between opposite electric charges. The two charges "recombine." Each time an electron re-combines with a positive charge, electric potential energy is converted into electromagnetic energy. With each recombination a quantum of electromagnetic energy is emitted in the form of a photon of light. The frequency of the light is characteristic of the semi-conductor material. A material emits photons in a very narrow frequency range. Using different materials to produce LED's with the right color emission effects RGB (red, green, blue) colors. The intensity of LED emission is proportional to the charge differential between the two sides. The LED is restricted to low-voltage on the order of 0.6 to 2.6 volts DC and milliamp currents. The design is not upwardly scaleable and an emission increase can only be effected by assembling an array of multiple LED.

The conventional x-ray tube is another example of recombination emissions. High-speed electrons, emitted by a thermionic electron source and accelerated by tens to hundreds of kilovolts of potential bombard a metal target producing characteristic and Bremsstrahlung radiation. Characteristic x-rays are produced when an accelerated electron knocks an electron from the inner shell of an anode atom. Electrons knocked from the inner shell of an atom are replaced by electrons dropping down from a higher state, outer shell position. The electron gives up its higher state energy in the form of characteristic x-rays with sharply defined frequencies associated with the difference between the atomic energy levels of the target atoms.

Emitted at discrete energies, they have a discrete spectrum. Deflected electrons give up their energy in the form of Bremsstrahlung or braking radiation which occurs when negatively charged electrons in motion are deflected toward positively charged atomic nuclei or away from negatively charged atomic nuclei. Deflection is equally balanced between attraction and repulsion. Deflection strips energy from the accelerated electron.

If the deflection is away from a negatively charged nuclei the electron will loose energy in steps and may not have enough energy to dislodge a shell electron. This action broadens the Bremsstrahlung frequency and increases the number of those emissions. The greater the kinetic energy of the accelerated electron, the greater the probability that it will dislodge an inner shell electron. Increasing the voltage increases the kinetic energy and the x-ray production efficiency. An accelerating voltage of <100 kV is 0.05% efficient whereas a voltage of >1 mV is 70% efficient. As energy density increases heat becomes a limiting factor and various methods are employed in attempts to cool the system. Emission is confined to a small lens area adjacent the target anode. The emitted x-rays diverge when leaving the lens area making it necessary to move the lens a measured distance from the specimen that is to be x-rayed, meaning that full body scans require the emitter to be several feet from the body which reduces the degree of definition permitted. The closer the x-ray emitter to the specimen the greater the revealed detail.

A miniature x-ray generator, known as COOL-X, uses a pyroelectric crystal, and is marketed by Amptek Inc. of Bedford Me. The unit does not provide a constant x-ray flux, and in particular, the flux varies throughout a 2-5 minute cycle and may also vary from cycle to cycle. It is theorized that a polarization change caused by the alternate heating and cooling of the pyroelectric crystal attracts and repels electrons which alternately impact the crystal and a copper target producing characteristic x-rays and Bremsstrahlung x-rays. It appears that the emission parameters of the COOL-X miniature x-ray generator are basically uncontrollable.

As is discussed in Nanotechnology, Vol. 2, No. 4, December 2003, low-voltage electron emission from cold-cathode semiconductor devices that eject electrons into the vacuum is based on Fowler-Nordheim tunneling and has been intensively investigated for the last several years. The emission electrons are variously referred to as hot electrons, ballistic electrons, and energetic electrons. The intent is to develop high-density emitters capable of stabilized electron emission and long term reliability that may be used in flat panel displays, photolithographic equipment, plasma etchers, electron curing, solid state lighting and so on. Basic to all designs is the need to apply a voltage bias between the upper and lower layers to initiate the Fowler-Nordheim tunneling action that propels substrate electrons through the upper layer to the vacuum interface. The positive electrode is thin in comparison to the mean free path of electrons in the electrode material such that tunneling electrons travel ballistically through the positive electrode. Peak energy is virtually linear dependent on applied voltage with the maximum output restricted by current and resistance limitations.

One drawback of low voltage emitters is the lack of inexpensive low voltage phosphors. The high voltage phosphors used in high voltage applications such as CRT's lack the carriers or holes necessary to effect bright light emission at reduced voltages. Current technology produces a steady and uniform electron stream at relatively low densities and requires wigglers or other methods to increase the density by bunching electrons as is common in traveling wave tubes and linear accelerator applications.

Additional references related to x-ray emitters and displays, include "A Simple X-Ray Emitter," H. Murakami, R. Ono, A. Hirai, Y. Hosokawa, Anal. Sci. 2005, vol. 21, "Phosphor Challenge for Field-Emission Flat-Panel Displays," C. Hunt, A. Chakhovskoi, J. Vac. Sci. Technol. B 15(2) March/April 1997, and "New Insights in High-Energy Electron Emission and Underlying Transport Physics of Nanocrystalline Si," S. Uno, K. Nakazato, S. Yamaguchi, A. Kojima, N. Kosida, H. Mizuta, IEEE Transactions on Nanotech., 2, 4, 2003.

It would be desirable to have apparatus and methods that recombine separated charge to convert electric potential energy into electromagnetic energy emissions.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 illustrates an exemplary method of generating electromagnetic energy;

FIG. 4 illustrates an exemplary embodiment of a Coulomb force oscillator;

FIG. 5 illustrates another exemplary embodiment of the Coulomb force oscillator embodying an emission coating on an emitter plate;

FIG. 6 illustrates yet another exemplary embodiment of the Coulomb force oscillator embodying a conductor link to a secondary emitter plate;

DETAILED DESCRIPTION

In its broadest sense, disclosed herein are apparatus and methods based on Coulomb's law that permit the attractive collection and repulsive discharge of high-density free electron charge. With the exception of devices that rely on resistance such as some forms of lighting most any AC or DC closed circuit device or system may be redesigned and powered by a Coulomb force oscillator.

In contrast, common electrical generation based on Faraday's law relative to current producing interactions of magnetic fields and conductors is by nature additive. Electrons displaced by magnetic fields are moved from the windings of a generator and forced along a first conductor passing through a materially conductive body or circuit before returning to the generator by a second conductor completing a pathway that is commonly referred to as a closed circuit.

However, relying on the Coulomb law as it relates to the attraction of opposite charge and the repulsion of like charge it is possible to remove free electrons from a conductive material via a single conductor and then return the same free electrons via the same conductor. A materially conductive body is subjected to a positive charge influence that in a first action removes free electrons and in a second action returns the same electrons permitting the recombination of electron-hole pairs releasing energy. This process is subtractive, in contrast to the conventional additive process, and when employed within certain arts is substantially more efficient.

As used herein, a Coulomb force oscillator (CFO) is any apparatus that can apply an oscillating charge potential to an object so as to effect a charge imbalance within the object by moving free electrons or charge carriers within the object or by removing free electrons or charge carriers from the object.

Figure 1:
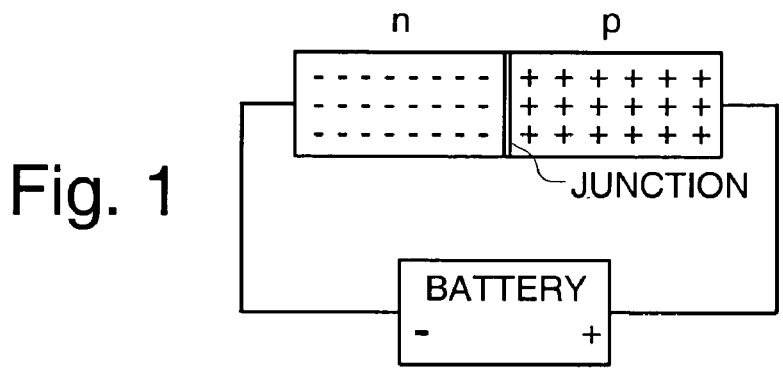
FIG. 1 illustrates operation of an exemplary light emitting diode (LED) resulting from Coulomb Force action.

Referring to the drawing figures, FIG. 1 illustrates operation of an exemplary light emitting diode (LED) resulting from Coulomb Force action. In FIG. 1, a light emitting diode (LED) emits visible light due to Coulomb Force action in which unlike charges attract and like charges repel. The LED's semiconductor chip has two sides of dissimilar material separated by a junction. One side (p) is dominated by positive electric charges and the other side (n) is dominated by negative electric charges. The junction acts as a barrier between the p side and the n side. A few volts applied to LED terminals cause electrons to flow from the n side to the p side. Once on the p side, the electrons are immediately attracted to the positive charges due to the mutual Coulomb forces of attraction between opposite electric charges. The two charges "re-combine." Each time an electron re-combines with a positive charge, electric potential energy is converted into electromagnetic energy. With each recombination a quantum of electromagnetic energy is emitted in the form of a photon of light. The frequency of the light is characteristic of the semiconductor material. A material emits photons in a very narrow frequency range. Using different materials to produce LED's effects the emission of RGB (red, green, blue) colors. The emissions level is limited by the charge differential between the p and n sides.

The n and p regions of the conventional LED semiconductor can be induced in any conductor by bringing a positive charge near the conductor. When this positive charge is removed, the separated charges within the conductor recombine and electric potential energy is converted into electromagnetic energy.

Figure 2A:
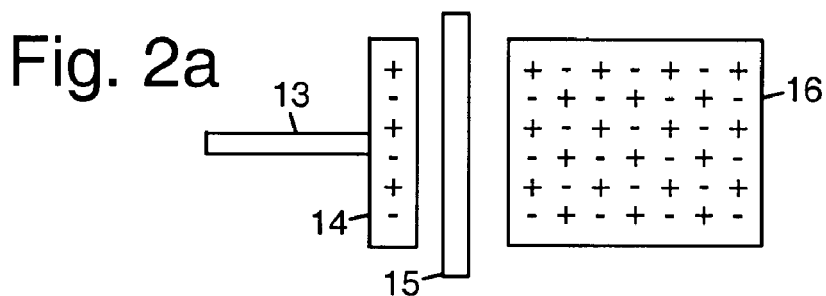
FIGS. 2a-2c illustrate operation of an exemplary charge plate resulting from Coulomb Force action.
Figure 2B:
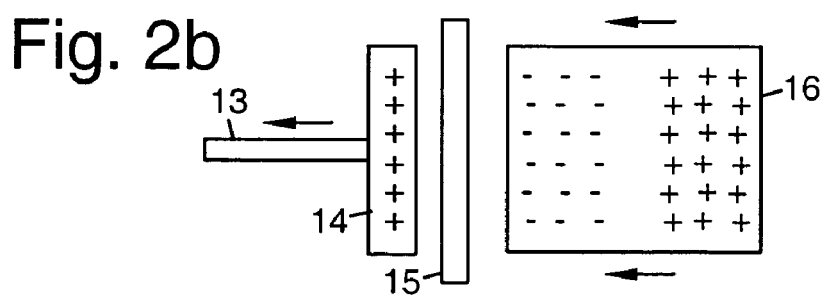
Figure 2C:
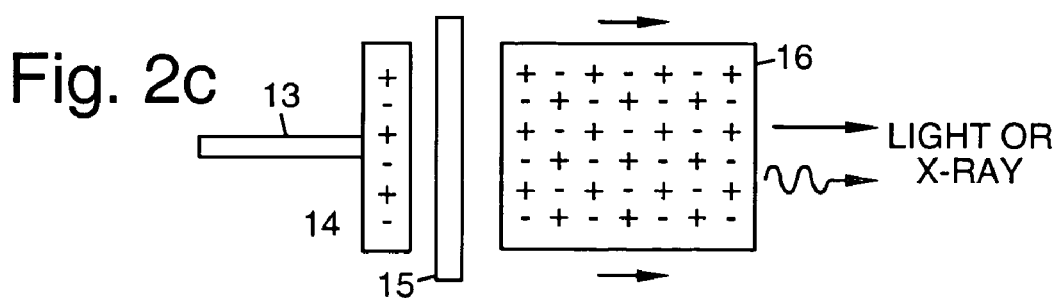

FIGS. 2a-2c illustrate operation of an exemplary charge plate 14 resulting from Coulomb force action. Referring to FIG. 2a, a charge plate 14 with conductor 13 is disposed to one side of a dielectric 15 and an emitter 16 is disposed to the opposite side. The charge plate 14 and emitter 16 have charges equally distributed in a balanced state of equilibrium.

In FIG. 2b arrows indicate electron flow direction as charge plate 14 is positively charged with free electrons removed by Coulomb force oscillator 10 and conductor 13. The positive charge of plate 14 attracts free electrons within emitter 16 creating a charge differential with emitter 16 as electrons gather at one end of the emitter and vacated holes form a positive charge at the opposite end of the emitter. The emitter 16 electrons are attracted toward plate 14 but unable to make contact due to the position of dielectric 15. The free electrons of emitter 16 form a space charge near the dielectric 15 and charge plate 14 and are bound by the positive charge of plate 14.

In FIG. 2c arrows indicate electron flow direction when the positive charge is removed from plate 14. The free electron space charge within the end of emitter 16 is now unbound and of like charge. Coulomb Law states that like charges repel and unlike charges attract. The unbound free electrons through mutual repulsion and the attraction of the positive charge at the opposite end of emitter 16 accelerate away from the dielectric. The accelerated electrons recombine with holes and emit photons of energy. These actions produce a high-density pulse that is relative to the eV charge density applied to plate 14. If the voltage applied to charge plate 14 is greater than the work function of emitter 16 electrons may be ballistically ejected from the emitter surface. The work function is the minimum energy (usually measured in electron volts) needed to remove an electron from the Fermi level in a metal to a point at infinite distance away outside the surface. The work function is generally about half the ionization energy of a free atom of the metal. For example, Caesium has ionization energy 3.9 eV and work function 1.9 eV. A high-voltage charge placed on charge plate 14 will result in the emission of a high-density electron pulse from emitter 16.

Referring to FIG. 3, it is a flow chart illustrating an exemplary method 50 of generating electromagnetic energy. The exemplary method 50 involves the following actions.

A charge potential is generated 51. Such a charge potential may be generated by using an inductive switching power supply having an open secondary winding (or a solid state switching circuit or by mechanical means or with magnetic fields) for example. In a first action, the charge potential is applied 52 to an object to effect a charge imbalance within the object. This may be achieved by moving free electrons or charge carriers within the object or by removing free electrons or charge carriers from the object. For example, this may be achieved by coupling one end of the open secondary winding to the object. The object is thus subjected to a positive charge influence using the open circuit to move or remove free electrons or charge carriers from the object and thus create holes therein. In a second action, the charge potential is removed 53 from the object allowing the free electrons or charge carriers to recombine with holes in the object and release energy from the object. For example, the open circuit is discharged to return the moved or removed electrons to the object to permit electron-hole pair recombination and energy release from the object.

Application and removal of the charge potential may be achieved by various methods including using a switching inductive power supply having an open secondary that powers a Coulomb force oscillator. This will be discussed in detail below.

FIG. 4 illustrates an exemplary embodiment of a Coulomb force oscillator 10. The embodiment of a Coulomb force oscillator 10 shown in FIG. 4 is comprised of an emitter plate 16 (emitter 16) which may be made of copper or other conductive material that is separated from a primary charge plate 14 (charge conductor 14) which may also be made of copper or other highly conductive material by a dielectric material 15. The emitter may also comprise an electron emitting material such as porous silicon, for example. A terminal conductor 13 is attached to the charge plate 14. In operation, in a first action, a positive charge potential is applied to the charge plate 14 via way of the terminal conductor 13. The positive electric field produced by this action attracts free electrons from within the emitter plate 16 toward the dielectric 15. The movement of electrons within the emitter plate 16 creates electron-hole pairs and a positive potential on the emitter surface opposite the dielectric 15.

In a second action, the positive charge potential is removed from the charge plate 14. The unbound electrons of the emitter plate 16 are attracted by the positive hole charges of the emitter plate 16. The electrons, through mutual repulsion of like charge, accelerate toward the holes of the electron-hole pairs. Photons are emitted as electrons and holes recombine. The time that is required to complete the first action wherein positive charge attracts electrons to the charge plate 14 is somewhat longer than the second action wherein the accumulated electrons by mutual repulsion accelerate toward the positive holes.

FIG. 5 illustrates another exemplary embodiment of the Coulomb force oscillator 10. The embodiment of the Coulomb force oscillator 10 shown in FIG. 5 is similar to the embodiment shown in FIG. 4 but has an emissive material 17, such as phosphor, applied to the emitter plate 16. Depicted as discontinuous particle protrusions, the emissive material 17 restricts and prevents lateral movement of electrons during the recombination process. Electrons may move laterally within the confines of each individual particle protrusion of the emissive material 17 but not between individual particle protrusions.

FIG. 6 illustrates yet another exemplary embodiment of the Coulomb force oscillator 10. The embodiment of the Coulomb force oscillator 10 shown in FIG. 6 is similar to the embodiment shown in FIG. 4, but has a conductor 18 attached to the emitter plate 16 and a secondary emitter 19 (or secondary emitter plate 19). In a first action, a positive charge potential is applied to the charge plate 14. The positive electric field produced by this action attracts free electrons from within the emitter plate 16, the conductor 18 and the secondary emitter 19 effecting a charge separation and positive potential in emitter 19. The intensity of the positive charge potential experienced by the secondary emitter 19 is relative to the charge applied to the charge plate 14. In a second action electrons returning by conductor 18 recombine with the positive charged holes of secondary emitter plate 19 effecting emission at distances remote from the charge plate 14 of the Coulomb force oscillator 10.

Figure 6A:
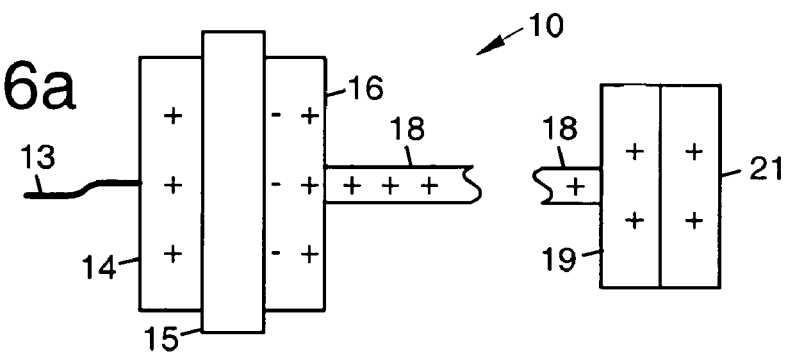
FIG. 6a is a cross-section of a secondary emitter with bonded emissive material
Figure 8:
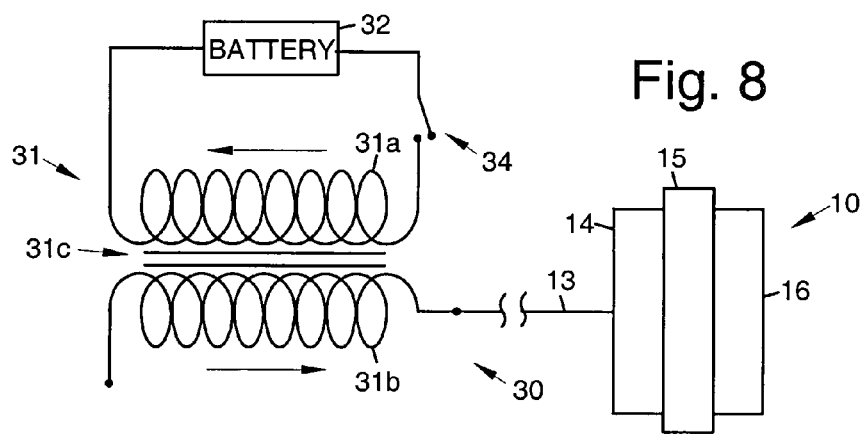
FIG. 8 illustrates an exemplary embodiment of an induction coil power supply that may be used to power Coulomb force oscillators.

Referring to FIG. 6a, it illustrates an embodiment of the Coulomb force oscillator 10 that comprises a secondary emitter 19 that has emissive material 21 bonded to it and that is coupled to the emitter plate 16 by way of a conductor 18. The secondary emitter 19 is shown coupled to the emitter plate 16 of the Coulomb force oscillator 10, which extends the reach of the Coulomb force oscillator 10. However, it is to be understood that the secondary emitter 19 may be coupled to the conductor 13 leading from a power supply 30 (FIG. 8)

Figure 6B:
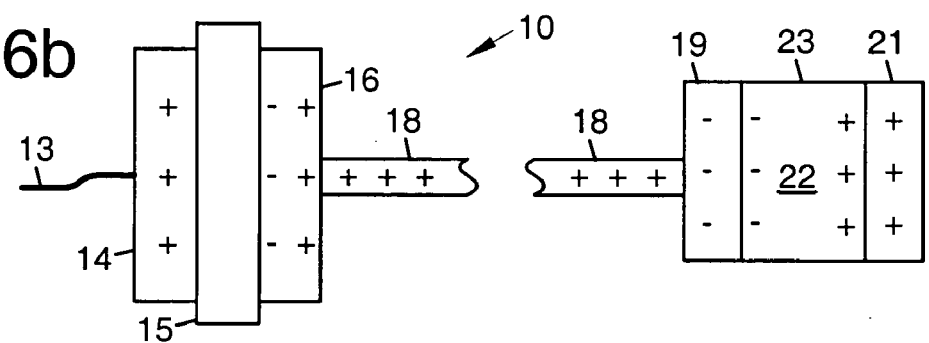
FIG. 6b is a cross-section of a secondary emitter with gas chamber used in the Coulomb force oscillator.

Referring to FIG. 6b, it illustrates another embodiment of the Coulomb force oscillator 10 that is extended by a conductor 18 to a secondary emitter 19, and wherein the emissive material 21 is separated from the secondary emitter 19 by a housing 23 that comprises a cavity 23 filled with low pressure gas 22. The secondary emitter 19 is shown coupled to the emitter plate 16 of the Coulomb force oscillator 10, which extends the reach of the Coulomb force oscillator 10. However, it is to be understood that the secondary emitter 19 may be coupled to the conductor 13 leading from a power supply 30 (FIG. 8).

In a first action, electrons are withdrawn from the low pressure gas 22 by the positive attraction of secondary emitter 19 by way of the conductor 18. The atoms of the gas 22 develop a positive charge, which pulls electrons from the emissive material 21. In a second, previously described action, accelerated electrons move from the secondary emitter 19 to the emissive material 21 by way of the gas 22. Electron-hole pairs recombine to emit electromagnetic energy. The need for the low-pressure gas 22 is eliminated when housing 23 is evacuated.

Figure 6C:
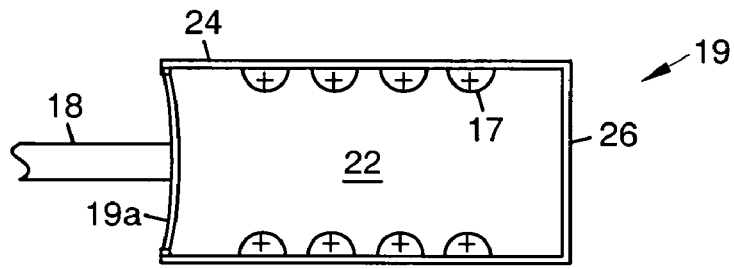
FIG. 6c is a cross-section of a tube-type secondary emitter used in the Coulomb force oscillator.

Referring to FIG. 6c, it shows a cross-section of a tube-type secondary emitter 19 that may be used with the Coulomb force oscillator 10 to confine x-ray emission using a waveguide action that results in an intensely focused x-ray emission. The embodiment shown in FIG. 6c comprises a free electron laser. The secondary emitter 19 is coupled by way of the conductor 18 to the emitter plate 16 of the Coulomb force oscillator 10, which extends the reach of the Coulomb force oscillator 10. However, it is to be understood that the s tube-type secondary emitter 19 may be coupled to the conductor 13 leading from a power supply 30 (FIG. 8).

The secondary emitter 19 shown in FIG. 6c has an inner wall of a non-transparent housing 24 covered with a discontinuous emissive material 21 in a form comprising microdots 21. A secondary emitter 19a at one end of the housing 24 is electrically isolated from the housing 24. An opposite end of the housing 24 may be sealed with a thin Beryllium window 26 that allows passage of x-ray emissions. The housing 24 is evacuated or filled with a low-pressure gas 22.

In a first action, electrons are withdrawn from individual emissive microdots 21 by the positive attraction of the secondary emitter 19 by the conductor 18. In a second, previously described action, returning electrons ejected by the secondary emitter 19 are attracted to the positive field of the individual emissive microdots 21, and electrons entering the housing 24 are attracted to the nearest microdots. As vacancies within these closest atoms are filled, a progressive action develops that draws electrons the full length of the housing 24. This action produces a wave of x-ray emission that follows and accelerates the already accelerated electrons. This action is similar to that of a wiggler such as is used in linear accelerator applications. The longer the housing 24 is, the greater the acceleration and the greater the beam strength. The Beryllium window 26 facilitates this action.

The reflective, waveguide action of the non-transparent housing 14 concentrates the x-ray emission. The tube actions as a whole are similar in scope to that of a free electron laser. Each electron striking a emissive microdot 21 give up a discrete amount of energy producing a monochromatic x-ray pulse from the open end of the tube 24. X-rays projected in any other direction are reflected or absorbed by the nontransparent housing 24. The housing 24 may have most any geometric design to produce strip, oval, or square patterns, for example. The arrangement and placement of the emissive microdots may be altered so as to effect changes in the emission waveform. The microdots may be nano sized depending upon design parameters. Although described as x-ray emissions, the emissions may be at any electromagnetic frequency, depending upon the materials and forces that are involved.

Figure 6D:
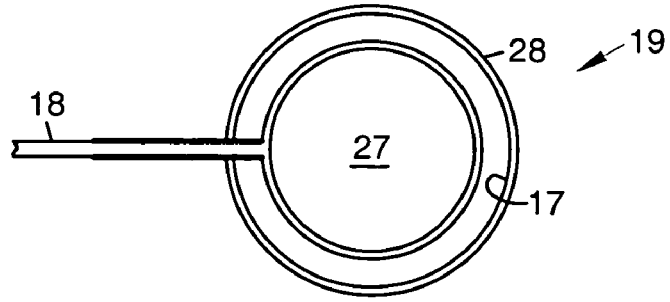
FIG. 6d is a cross-section of a miniature bulb-type emitter used in the Coulomb force oscillator.

Referring to FIG. 6d, it shows a cross section of a miniature bulb-type emitter 19 that may be used with the Coulomb force oscillator 10. The embodiment shown in FIG. 6d comprises a miniature x-ray emitter. The secondary emitter 19 is coupled by way of the conductor 18 to the emitter plate 16 of the Coulomb force oscillator 10, which extends the reach of the Coulomb force oscillator 10. However, it is to be understood that the s bulb-type secondary emitter 19 may be coupled to the conductor 13 leading from a power supply 30 (FIG. 8).

The miniature x-ray source is effected when a small inner bulb 27, comprising a secondary emitter 19, is connected to an insulated conductor 18 and enclosed by a slightly larger outer transparent bulb 28. The inside of the larger transparent bulb 28 is covered with discontinuous emissive microdots 17. In a first action, a positive charge potential is applied to the charge plate 14. The positive field attraction produced by this action draws free electrons from the conductor 18 and the attached inner bulb 27 toward the emitter plate 16. This action causes the inner bulb 27 to develop a positive charge due to its loss of electrons to the emitter plate 16. This positive charge attracts free electrons from the emissive microdots 17. Electrons jump the gap between the transparent bulb 28 and the inner bulb 27 and impact the inner bulb 27 producing Bremsstrahlung and characteristic x-rays. In a second action the positive charge is removed from the charge plate 14. Mutual repulsion of like charge propels the electrons off the emitter plate 16 toward the emissive microdots 17. Electrons jump the gap and impact the emissive microdots 17, projecting characteristic and Bremsstrahlung radiation radially from the outer transparent bulb 28. A non-transparent covering selectively applied to the outer surface of the outer transparent bulb 28 may be used for directional emission control.

Figure 7:
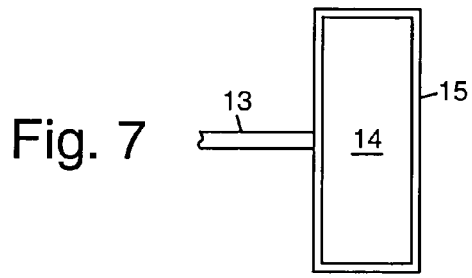
FIG. 7 is a cross-section of yet another embodiment of the Coulomb force oscillator.

Referring to FIG. 7, it is a cross-section of yet another embodiment of the Coulomb force oscillator 10. As is shown in FIG. 7, the Coulomb force oscillator 10 may comprise a conductor 13 that is coupled to a single primary charge plate 14 covered with dielectric material 15. This embodiment does not need an attached secondary emitter plate 16, because liquids, gasses or solids in close proximity experience redistribution of charge and in effect become the secondary plate. This embodiment of the Coulomb force oscillator 10 may be immersed in liquids, attached to solid bodies, or used as a charged body in other embodiments.

FIG. 8 depicts exemplary induction coil apparatus 30 (power supply 30) that may be used to power Coulomb force oscillators 10. The induction coil apparatus 30 may be used to withdraw free electrons from the primary charge plate 14 of the Coulomb force oscillators 10. The induction coil apparatus 30 comprises an induction coil 31 having primary 31a and secondary coils 31b. The Coulomb force oscillator 10 is attached by way of the conductor 13 to a first end of the secondary coil 31b of the induction coil apparatus 30 (power supply 30). The power supply 30 also comprises a battery 32 coupled between a second end of the primary coil 31a and a switch 34 coupled between the battery 32 and the first end of the primary coil 31a.

In operation, the primary coil 31a is energized causing a magnetic field to envelop the secondary coil 31b. This expanding magnetic field of the primary displaces electrons within the winding of the secondary causing free electrons to move in the opposite direction from that of the current flow in the primary winding. These displaced electrons are held in place by the magnetic field of the primary causing a voltage differential between the opposite ends of the open secondary winding. The voltage differential is a voltage potential that is used to effect work outside the coil. The conductor 13 is attached to the positive end of the secondary and the charge plate 14 causing the charge plate to experience a positive charge as electrons move toward the positive charge attraction of the secondary coil. The high-density charge of displaced electrons is bound by the positive charge produced within the secondary. When the current is stopped within the primary coil 31a, the magnetic field collapses. The displaced electrons previously bound by the positive charge at the secondary are now unbound and being of like charge are mutually repelled away from the secondary toward the positive charge region of the charge plate 14.

When the first end of the secondary coil 31b is attached to the charge plate 14 the second end of the secondary coil 31b may be attached to an external charge block or sphere similar in design and function to that of a Van de Graff generator so that free electrons removed via conductor 13 may be stored through a number of cycles and then returned or used otherwise.

Figure 9:
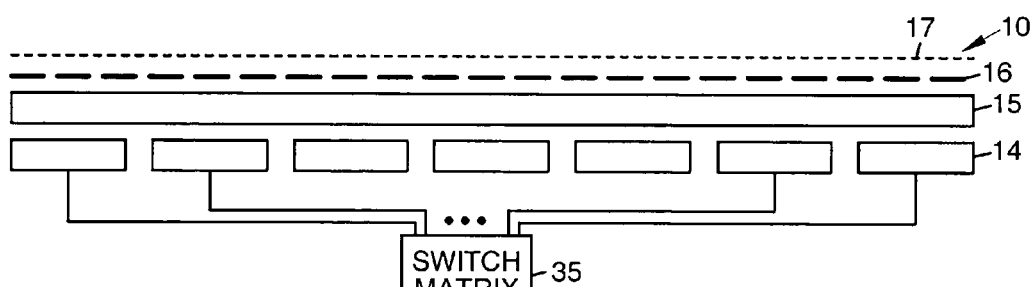
FIG. 9 is a cross section of apparatus employing a Coulomb force oscillator having segmented and individually addressable charge plates that may be used as a display device.

FIG. 9 is a cross section of apparatus employing a Coulomb force oscillator 10 having segmented and individually addressable charge plates 14 that may be used as a display device. The exemplary apparatus includes an induction coil apparatus 30, or power supply 30, which is coupled by way of a switch matrix 35 to the segmented and individually addressable charge plates 14. In addition, the emitter plate 16 is also segmented.

The charge plates 14 are separated from emitter plates 16 by dielectric material 15. The emitter plates 16 are shown as multiple microdots. The emissive nanodot material 17 may be applied directly to the segmented emitter plate 16 microdots or applied to sheeting that is positioned near the segmented emitter plate 16 with an area between them evacuated or gas filled. The segmented charge plates 14 and segmented emitter plate 16 are two separate circuits interacting through the dielectric material 15. The segmented emitter plates 16 and the emissive nanodot material 17 form one circuit. The segmented charge plates 14 and its electronic power supply 30 form a separate circuit. Charge oscillates between the emitter plates 16 and the emissive material 17 due to the application and removal of a positive charge potential at the charge plates 14. Capacitive-inductive action separates the attractive force of the positive charge potential of the charge plates 14 from the emitter plates 16 to provide for the collection and emission of high-density electron charge.

When a positive charge potential is applied to a particular charge plate 14, the emissive material 17 gives up electrons to an emitter plate 16. When the charge is removed from the charge plate 14, electrons accelerate from the emitter plate 16 and strike the emissive material 17, recombining with holes and releasing photons. The emissive material 17 may comprise a single carbon nanotube, or may comprise millions of nanodots 17 applied to a large surface. A single microdot 16 can effect the emission of a thousand nanodots 17. The charge plate 14 can be proportionally sized relative to the emitter plate 16 and the application. The charge plate 14 may be a single plate controlling all of the emitter plates 16 or it may be comprised of multiple segments controlling fractional portions of the emitter plates 16, as would be used in large area displays or computer screens. The spacing between discontinuous particle protrusions 17 comprising the emissive material 17 prevent lateral interchange of electrons. The use of discontinuous particle protrusions creates a lens area that is equal in size to the emitter plate providing for an even, simultaneous distribution of emissions over large areas. All electron movement is governed by Coulomb forces and the flow is between individual particles of the emissive material 17 and the emitter plate 16. Electrons move in equal numbers between emissive material 17 and emitter plate 16 relative to the inducing electric field strength applied to individual particles of the emissive material 17.

Figure 10:
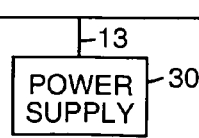
FIG. 10 is a cross section of apparatus employing a Coulomb force oscillator that may be used as a display device.

FIG. 10 is a cross section of apparatus employing a Coulomb force oscillator 10 that may be used as a display device or solid state lighting device. The apparatus shown in FIG. 10 employs an induction coil apparatus 30, or power supply 30, to control operation of the Coulomb force oscillator 10. This embodiment of the Coulomb force oscillator 10 does not require the use of the emitter plate 16. The emissive material 17, or microdots 17, may be applied to an inner surface of a transparent cover plate 36 or panel 36, which is adjacent to the dielectric material 15. The Coulomb force oscillator 10 attracts and discharges charge in the manner discussed with regard to FIG. 7.

The inexpensive, cold-cathode, ballistic-electron emission of the Coulomb force oscillator 10 makes possible the use of large modular panels for use in fluoroscopy applications. Emission is not confined to a small lens area as common to current x-ray technology. The area of emission is relative to screen size due to the discontinuous emissive material making it possible to design fluoroscopy type screens that permit the scanning of large shipping containers and even semi-trucks. When emission is in the non-ionizing terahertz frequency, fluoroscopy screens can be used in security situations to rapidly scan masses of people moving through checkpoints. Portable CFO-driven fluoroscopy units may be used by veterinarians to view birthing problems in livestock. Small hand-held fluoroscopy units may be used by medical personnel at accident scenes and in trauma centers to quickly determine hidden injuries. An x-ray source may be constructed in cylindrical form using modular sections and then combined to form any length required as in manufacturing processes or for irradiation applications. Emission may be directed inwardly or outwardly.

Reduced to practice embodiments of the Coulomb force oscillator 10 have been shown to provide a scaleable light source that is capable of producing discrete energies of high intensity from low voltage application, while maintaining a lens area equal in size to the area of the emitter plate 16 for use in a wide range of applications.

Electroluminescence, a form of recombination emission, occurs when an electron recombines with a positively charged atom from which an electron has been removed, creating an electron-hole pair. This is effected by first removing the electron by applying a positive electrical field to a charge plate 14 which is separated from an emitter plate 16 by a dielectric material 15. The positive charge attracts free electrons from within the emitter plate 16 and removes electrons from bands of individual atoms (classically speaking) causing a positive charge. Then, the positive charge is removed from the charge plate 14 and the separated electrons recombine with positive holes and photons are released. Capacitive action of the Coulomb force oscillator 10 collects and stores electron charge over a relatively long period of time and then discharges that accumulated charge in a relatively short period of time effecting a high-density electron discharge.

The Coulomb force oscillator 10 uses a recombination process wherein charge separation within the emitter plate 16 is effected by the application and removal of positive charge on the charge plate 14. The emitter plate 16 may be comprised of any conductive material. It may be covered with a coarse powder or pellet material that itself, becomes an emitter and effectively prevents lateral current flow within the coating material. The emitter plate 16 may be comprised of a single microdot 17 or it may be comprised of millions of nanodots 17 applied to a large surface. The emitter plate 16 may also comprise a single carbon nanotube or multiple carbon nanotubes. The smaller the emitter plate 16 is, the more confined the point of emission is and the greater the emission density. Separation of charge within the emitter plate 16 is controlled by the voltage applied to the charge plate 14, the area of the field and the distance between the charge plate 14 and emitter plate 16. The emission frequency of electron recombination in the second action is relative to the emitter 16 composition, and the voltage used to remove the electrons in the first action.

When the emitter plate 16 comprises microdots 17 and the charge plate 14 comprises macrodot segments (FIG. 9), positive charge applied to a single charge plate segment effects attraction in many emitter microdots 17 and the attraction varies depending upon radius.

The light source provided by the Coulomb force oscillator 10 is infinitely scaleable starting with a single atom. The use of modular panels permits the building of any required display size. A secondary emitter plate 16 may be remote from the basic Coulomb force oscillator 10. When connected to the emitter plate 16 of the basic Coulomb force oscillator 10 by a conductor 18, the secondary emitter 19 can effect emission hundreds of feet from the basic Coulomb force oscillator 10. When an emissive material 17 is offset from and bonded to the emitter plate 16 by a support structure, the volumetric area between the emissive material 17 and emitter plate 16 can be vacated or gas filled. The support structure may be of any design such as diamond, square, honeycomb or closely spaced single risers. The supports should be firmly bonded to both the emissive material 17 and the emitter plate 16 to prevent flexing, which would alter the gap distance and could prevent transfer of electrons. The gas effects a partial current bridge between the emissive material 17 and the emitter plate 16. In operation, the positive charge attraction of the emitter plate 16 pulls free electrons from the outer shell of gas atoms. The holes act as carriers and electrons move hole to hole from the emissive material 17 to the emitter plate 16 and back again.

During operation of the Coulomb force oscillator 10, there is an initial balanced state in which the atomic nuclei of the emitter plate 16 have an equal number of positively and negatively charged nuclei. The removal of electrons by a first action effectively changes atomic nuclei to a positive charge attraction. The number of repulsion deflections is decreased and the number of attraction deflections is increased. The greater attractive forces, increases the number and intensity of characteristic emissions.

In the case of the Coulomb force oscillator 10, the energy spectrum of this light source is different than that produced by conventional light sources that employ two electrodes and the application of external current. The characteristic lines are stronger at a lower voltage and Bremsstrahlung background is less broad and less intense due to the dual action of the Coulomb force oscillator 10 in removing and returning electrons to the emitter plate 16. Electrons removed in the first action are returned in the second action to previously vacated holes. All electrons recombining in the emitter plate 16 are electrons that were previously removed from the emitter plate 16. These electrons are deflected toward hole positions by positive nuclei attraction. The effect is a reduction of Bremsstrahlung x-rays and an increase of characteristic emission whose discrete energy is relative to the kinetic energy imposed by positive nuclei attraction, and acceleration due to voltage and repulsion of like charge.

The use of an induction coil 31 as shown in FIG. 8, is one way that can be used to create a positive charge. The induction coil 31 comprises a primary coil 31a having relatively few turns of heavy wire wound around an iron or ferrite core, and a secondary coil 31b having many turns of fine insulated wire, wound in layers on top of the primary coil 31a. A direct current flowing through the primary coil 31a magnetizes the core. While the current is rising, an expanding magnetic field is established and a voltage potential is induced in the winding of the secondary coil 31b. An instant later, after the core has been sufficiently magnetized, the current within the primary coil 31a is interrupted or switched off (by the switch 34). The resulting sudden collapse of the magnetic field about the primary coil 31a induces a very high voltage (of opposite polarity) in the secondary coil 31b, which is aided by the many turns of fine wire linking the primary flux. The collapsing magnetic field displaces electrons within the secondary coil 31b and a strong electron pulse moves out of the secondary coil 31b. Induction can produce a very high secondary voltage, constantly changing in polarity, within the secondary coil 31b.

Thus, a Coulomb force oscillator that generates electromagnetic energy output has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Electromagnetic apparatus comprising:
 a direct current power source having first and second terminals;
 a switch coupled to the first terminal of the direct current power source for switching the power source on and off; and
 a transformer comprising a primary winding that is coupled between the switch and the second terminal of the power source to form a closed circuit, and an open secondary winding that is inductively driven by the primary winding.

2. The apparatus recited in claim 1 wherein an expanding magnetic field produced by the primary winding caused by switching the power source on causes charge differential within the secondary winding creating a current flow of free electrons within the secondary winding resulting in a separation of positive charges and negative charges comprising the free electrons within the secondary winding
 wherein such charge separation effects charge separation in an external body coupled to the secondary winding
 wherein switching the power source off causes a collapse of the magnetic field in the primary winding which causes the secondary winding to return to a steady state condition, which causes charge recombination the external body effecting release of energy.

3. The apparatus recited in claim 1 further comprising a charge conductor coupled to one end of the secondary winding for removing electrons from the external body.

4. The apparatus recited in claim 1 further comprising a dielectrically isolated charge conductor coupled to one end of the secondary winding for removing electrons from the external body.

5. The apparatus recited in claim 4 wherein the dielectrically isolated charge conductor comprises a dielectrically encapsulated conductor for removing electrons from an external body disposed in a fluid.

6. The apparatus recited in claim 4 wherein the dielectrically isolated charge conductor comprises:
a charge conductor coupled to one end of the secondary winding;
an emitter; and
dielectric material disposed between the emitter and the charge conductor;
whereby creating a positive charge potential on the charge conductor separates charge in the emitter to create electron-hole pairs therein, and whereby removing the positive charge potential from the charge conductor causes recombination of electron-hole pairs.

7. The a apparatus recited in claim 6 wherein the emitter comprises a photon emitting material, and whereby recombination of electron-hole pairs emits photons from the emitter.

8. The apparatus recited in claim 6 further comprising a second charge conductor coupled the emitter.

9. The apparatus recited in claim 6 further comprising a second emitter conductively coupled the emitter that comprises an inner housing enclosed by a transparent outer housing having emissive material disposed on a surface thereof.

10. The apparatus recited in claim 9 wherein the emissive material is disposed on an inner surface of the transparent outer housing and which further comprises a non-transparent covering selectively applied to an outer surface of the outer transparent housing to provide for directional emission control.

11. The apparatus recited in claim 1 further comprising:
a second emitter; and
a housing coupled between the second charge conductor and the second emitter that comprises a cavity filled with a noble gas.

12. The apparatus recited in claim 1 further comprising:
a nonconductive non-transparent housing having an inner wall comprising emissive particles;
a second charge conductor disposed at one end of the housing that is coupled to the emitter, insulated from the housing, and has an outer insulated surface; and
a transparent window disposed at an opposite end of the housing from the second charge conductor that is transparent to electromagnetic energy emitted by the emissive particles.

13. The apparatus recited in claim 12 wherein the housing is evacuated or contains a noble gas.

14. Electromagnetic apparatus comprising:
an emitter;
a charge conductor that is dielectrically isolated from the emitter; and
voltage differential producing apparatus coupled to the dielectrically isolated charge conductor for removing free electrons from the emitter and returning the free electrons to the emitter.

15. The apparatus recited in claim 14 wherein the voltage differential producing apparatus comprises:
a direct current power source having first and second terminals;
a switch coupled to the first terminal of the direct current power source for switching the power source on and off; and
a transformer comprising a primary winding that is coupled between the switch and the second terminal of the power source to form a closed circuit, and an open secondary winding that is inductively driven by the primary winding and has one end coupled to the dielectrically isolated charge conductor.

16. The apparatus recited in claim 14:
whereby creating a positive charge potential on the charge conductor separates charge in the emitter to create electron-hole pairs therein, and whereby removing the positive charge potential from the charge conductor causes recombination of electron-hole pairs.

17. The apparatus recited in claim 16 further comprising:
a second emitter; and
a second conductor coupled between the emitter and the second emitter.

18. The apparatus recited in claim 17 further comprising a housing that comprises a cavity filled with a noble gas disposed between the second conductor and the second emitter.

19. The apparatus recited in claim 17 further comprising:
a non-transparent housing having an inner wall comprising emissive material;
wherein the second emitter is disposed at one end of the housing and is insulated therefrom; and
a transparent window disposed at an opposite end of the housing from the second emitter.

20. The apparatus recited in claim 16 further comprising a second emitter conductively coupled the emitter that comprises an inner housing enclosed by a transparent outer housing having emissive material disposed on a surface thereof.

21. The apparatus recited in claim 20 wherein the emissive material is disposed on an inner surface of the transparent outer housing and which further comprises a non-transparent covering selectively applied to an outer surface of the outer transparent housing to provide for directional emission control.

22. A method for generating electromagnetic energy comprising:
controllably generating a charge potential;
applying the generated charge potential to an object to effect a charge imbalance within the object; and
removing the charge potential from the object to effect recombination of electron-hole pairs within the object, which recombination releases electromagnetic energy from the object.

23. Electromagnetic apparatus comprising:
an emitter;
a charge conductor dielectrically isolated from the emitter; and
voltage differential producing apparatus coupled to the dielectrically isolated charge conductor for generating a charge imbalance within the emitter to effect recombination of electron-hole pairs within the emitter and release electromagnetic energy from the emitter.

24. Electromagnetic apparatus comprising:
an emitter;
a charge conductor dielectrically isolated from the emitter; and
voltage differential producing apparatus coupled to the dielectrically isolated charge conductor for removing free electrons from the emitter and returning the free electrons to the emitter to effect recombination of electron-hole pairs within the emitter and release electromagnetic energy from the emitter.

* * * * *